US006925533B2

(12) United States Patent
Lewis

(10) Patent No.: US 6,925,533 B2
(45) Date of Patent: Aug. 2, 2005

(54) VIRTUAL DISK IMAGE SYSTEM WITH LOCAL CACHE DISK FOR ISCSI COMMUNICATIONS

(75) Inventor: Russell L. Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 10/431,110

(22) Filed: May 7, 2003

(65) Prior Publication Data

US 2004/0225837 A1 Nov. 11, 2004

(51) Int. Cl.[7] .............................................. G06F 12/08
(52) U.S. Cl. ..................................... 711/118; 711/202
(58) Field of Search ................................. 711/118, 202, 711/206, 6; 709/217, 218

(56) References Cited

U.S. PATENT DOCUMENTS

| 5,671,385 A | 9/1997 | Jost |
| 5,715,418 A | 2/1998 | Atsatt et al. |
| 5,884,098 A | 3/1999 | Mason, Jr. |
| 6,425,036 B2 | 7/2002 | Hoese et al. |
| 2001/0037433 A1 | 11/2001 | Dempsey et al. |
| 2002/0019863 A1 | 2/2002 | Reuter et al. |
| 2002/0026558 A1 | 2/2002 | Reuter et al. |
| 2002/0029326 A1 | 3/2002 | Reuter et al. |

FOREIGN PATENT DOCUMENTS

WO WO 01/44891 A2 6/2001

OTHER PUBLICATIONS

Y. Tamir, et al., "Hierarchical Coherency Management for Shared Virtual Memory Multicomputers", Journal of Parallel and Distributed Computing, vol. 15(4), pp. 408–419, Aug. 1992.
Dossier, YOR920020015, "Virtualization of ISCSI Storage".

*Primary Examiner*—Hiep T. Nguyen
(74) *Attorney, Agent, or Firm*—Scully, Scott, Murphy & Presser; Jean M. Barkley, Esq.

(57) ABSTRACT

A system and method for caching data received over a network connection comprising: a target device for receiving requests for routing data packetized for transport according to an Internet SCSI (iSCSI) transport protocol, the target device including an iSCSI drive for processing received SCSI commands; an initiator device for generating SCSI commands for reading data and writing data from/to storage devices associated with the iSCSI drive; a local disk at the initiator device for storing a copy of data read from or written to the storage devices associated with the iSCSI drive; and, a mapping device for mapping addresses associated with data stored at storage devices associated with the iSCSI drive with local data storage units in the local disk device, wherein seamless local caching of data at the initiator from data at remote data storage devices associated with the iSCSI drive is provided.

19 Claims, 1 Drawing Sheet

VIRTUAL DISK IMAGE SYSTEM WITH LOCAL CACHE DISK FOR ISCSI COMMUNICATIONS

BACKGROUND OF THE INVENTION

1. Field of the Invention

The present invention relates to storage area networks and network communications, and particularly, to a system for locally caching data obtained via a remote data connection in accordance with an IP-based packet communications protocol.

2. Discussion of the Prior Art

With the advent of the Internet SCSI (Small Computer System Interface) or iSCSI, an Internet Protocol-based storage networking standard, data storage devices may be linked to facilitate the formation of Storage Area Networks (SAN) having increased capabilities and improved performance. As shown in FIG. 1, SANs 19, 29 that include servers and data storage devices 20, 25, 30 may be interconnected over longer distances, e.g. over IP networks, such as the Internet 99. For example, iSCSI may be supported over physical media that supports TCP/IP as a transport, and iSCSI implementations today are preferably on Gigabit Ethernet, supporting speeds of at least 10 Gbyte/sec.

ISCSI, more particularly, comprises the rules and processes to transmit and receive block storage applications over TCP/IP networks, and particularly the iSCSI protocol enables SCSI commands to be encapsulated in TCP/IP packets and delivered over IP networks. Thus, implementing SCSI commands over IP networks may be used to facilitate block-level data transfers over Intranets, local area networks (LANs), wide area networks (WANs), the Internet, and the like, and can enable location-independent data storage and retrieval, e.g., at remote workstations or devices devices 15, 50. The iSCSI additionally permits shared storage solutions such as tape drives and RAID units to be shared over IP.

In such SAN systems, it is desirable to enable a single remote end-user device, e.g., PC or workstation, 15, 50 to locally store or "cache" transferred data (block-level transfers) during a remote SCSI data access. Caching is useful because, often, the user will repeatedly access the same data; having that data in cache makes it quicker to access. Remote end-user devices normally have caches that cache disk contents, however, these are generally RAM-only caching techniques and are limited in terms of amount of storage space. That is, large (e.g., multi-gigabyte) RAM-only caches are only practical in the largest of systems.

While file-level caching techniques are available that allows parts of files to be cached, they do not cache block data transfers.

Further, while proxy server devices and virtualization devices exist that internally cache the contents of an iSCSI disk on their local disks, these are generally large and expensive devices to be used by a large group of people.

Thus, an inexpensive and simple cache solution for a single end-user machine for storing data blocks transferred as packets over networks according to an IP-packet based protocol would be highly desirable.

SUMMARY OF THE INVENTION

It is thus an object of the present invention to provide a system and method that allows a computer to access a large virtual map of storage while having a much smaller amount physically available in fast, local disk.

According to the principles of the invention, there is provided a system and method for caching data received over a network connection comprising:

a target device linked to a computing network and capable of receiving requests for routing data packetized for transport according to an Internet SCSI (iSCSI) transport protocol, the target device including an SCSI drive for processing received SCSI commands;

an initiator device linked to said computing network for generating the SCSI commands for network transport according to the iSCSI protocol, said commands including to read data from or write data to storage devices associated with the iSCSI drive; and, a local disk at said initiator device for storing a copy of data read from or written to the storage devices associated with the iSCSI drive; and, mapping means for mapping addresses associated with data stored at storage devices associated with the iSCSI drive with local data storage units in the local disk, wherein the local disk provides seamless local caching of data at the initiator from data at remote data storage devices associated with the iSCSI drive.

Advantageously, the present invention provides great benefit for both enterprise and any individual user having a comparatively slow network access (e.g., home office, congested network in an office), or when access to large amounts of data is needed (scientific analysis), as the invention noticeably increase speed performance.

BRIEF DESCRIPTION OF THE DRAWINGS

Further features, aspects and advantages of the apparatus and methods of the present invention will become better understood with regard to the following description, appended claims, and the accompanying drawing where:

DETAILED DESCRIPTION OF THE PREFERRED EMBODIMENTS

An Internet-Draft located at http://www.ietf.org/internet-drafts/draft-ietf-ips-iscsi-20.txt generated in full conformance with all provisions of RFC2026 is incorporated by reference as if fully set forth herein to describe the iSCSI networking protocol, its system architectural model and command structure.

Figure 1:
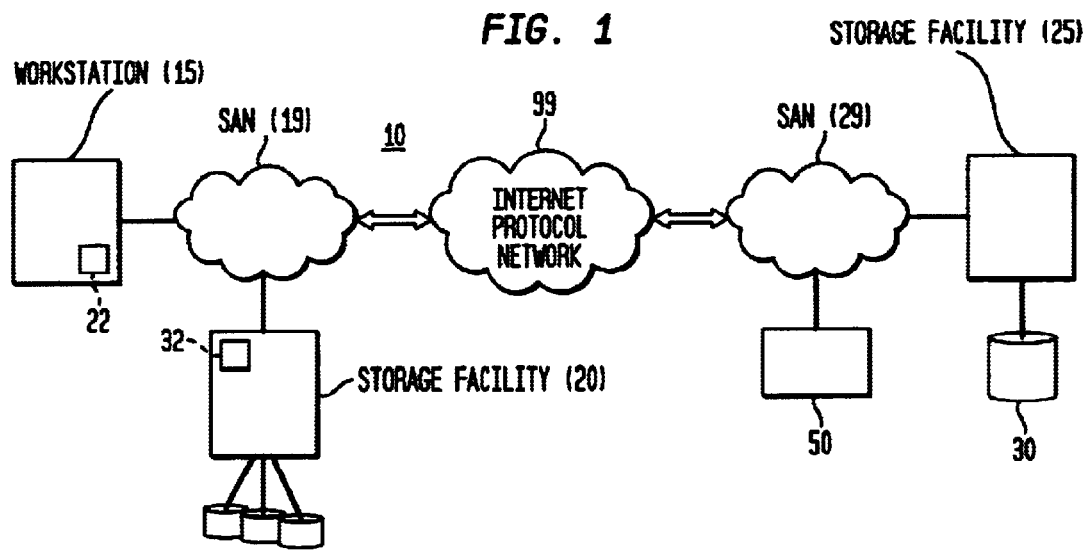
FIG. 1 depicts an exemplary iSCSI system 10 based on the existing SCSI (Small Computer Systems Interface) capable of implementing the client-side cache mechanism of the invention.

As known and depicted in FIG. 1, iSCSI systems 10 are based on the existing SCSI (Small Computer Systems Interface) standard currently used for communication among servers and their attached storage devices. Generally, the iSCSI protocol provides a mapping of the SCSI remote procedure invocation model over the TCP protocol. SCSI commands are carried by iSCSI requests and SCSI responses and status are carried by iSCSI responses. iSCSI also uses the request response mechanism for iSCSI protocol mechanisms. SCSI has two types of devices—Initiators 22 (usually implemented in a server, which starts the communications by issuing the commands to be executed) and Targets 32 (usually storage/server devices, which respond to the initiators and carry out the commands). SCSI commands or tasks are executed to initiate the transfer of data from an initiator, e.g., to the target (typical via a WRITE command), or from the target to the initiator (a READ command).

Particularly, as shown in FIG. 1, a typical end-user workstation 50 is provided and shown connected to an IP-based storage area network, e.g., SAN 29, and capable of accessing data from data storage facilities 20, 25 utilizing the iSCSI commands over an IP-based packet communications protocol. In accordance with the principles of the invention, the end-user workstation 50 is provided with the capability for virtually storing data obtained from a remote storage device over an IP network 99.

Figure 2:
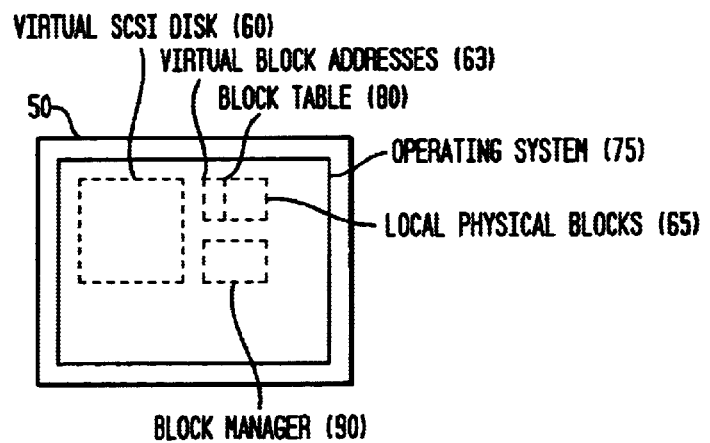
FIG. 2 depicts a virtual SCSI Disk 60 defined at a user's workstation 50 and which corresponds to a (remote) volume that the workstation 50 may reach utilizing the iSCSI commands over the IP-based packet communications protocol.

More particularly, as shown in FIG. 2, a Virtual SCSI Disk 60 is defined on a user's workstation 50. This virtual disk 60 corresponds to a (remote) volume that the workstation 50 may reach utilizing the iSCSI commands over the IP-based packet communications protocol. Particularly, a set of "Virtual Block Addresses" are used by the workstation's operating system 75 to access the data on the Virtual Disk 60 as though it were a local, physical disk. A (smaller) local, physical disk contains a cache of some of the blocks of the disk image. A "Block Table", 80, comparable to a page table in a typical computer system, is used to map Virtual Block Addresses 63 to blocks 65 on the local cache disk 60. Accesses to currently uncached blocks cause "Block Faults", which work just like page faults, i.e. a virtual disk manager "swaps out" one or more blocks from the cache and "swaps in" blocks from the larger, slower, remote device attached through iSCSI communications protocol.

The preferred embodiment implements a write-back (asynchronous) cache, however, one skilled in the art will appreciate that other cache mechanisms, such as write-through (synchronous) caches may be implemented.

As depicted in FIG. 2, the two new components of the workstation include: 1) the Block Table 80 data structure that enables the mapping of virtual block addresses 63 to local physical blocks 65 and, particularly saves the information about what data is being cached, and where it resides physical in the local hard disk; and, 2) the Block Manager 90 that is the component for managing and updating the Block Table and further handles "block fault" exceptions, which happen when a virtual address cannot be mapped to a physical block. It is responsible for forwarding the SCSI command through an iSCSI link to the larger, remote storage and downloading the block(s) into cache. It is also responsible for writing out "dirty" blocks to the remote storage. It is understood that each component, 80, 90 may implemented in software or hardware.

Assuming that the local disk 60—or at least the block table 80—is SCSI, the local accesses are easily mapped to the proper iSCSI commands. Alternately or in addition, the "Virtual Block Addresses" may be the same block addresses used by iSCSI to access the remote volume. That is, iSCSI has the property that it still speaks the SCSI protocol. Thus, the local cache disk and the iSCSI disk both speak the same language—SCSI. This makes it very easy to map one to the other.

Thus, to set up the iSCSI virtual cache disk system, according to the invention, an iSCSI hard drive on a networked server, which may be the same size as a current hard drive on a user station, is configured for use. As known to skilled artisans, the installation may require upgrades to the BIOS on the user's computer, giving it the ability to speak iSCSI over the network. At this point, the user may see two hard disk drives: one being the user's normal hard drive, and the other being the new iSCSI drive. If preferred, the user may copy all the data and programs to that iSCSI drive, and disable the user's local (physical) drive. Thus, the user will see only one drive—the iSCSI drive and, all the benefits attendant to implementing the drive including backups utilities (the iSCSI server does automatic backups and will automatically fix certain types of failures). Additionally, if the user ever needs more space, the iSCSI drive may be automatically expanded to be as large as the user's need. In the preferred embodiment of the invention, however, a new device driver is required to be installed to operate in such a manner that the once disabled, the user's local (physical) drive is re-enabled. However, this is transparent to the user, i.e., the user will never see the local disk. Rather, every time the user reads or writes on the iSCSI disk, the local disk 60 keeps a copy. Anytime that the user needs that data again, it is obtained from the local drive instead of iSCSI. Thus, advantageously, saving a file is performed as fast as it used to. When most programs and/or files used by the user are opened, there is negligible "iSCSI delay" as the local workstation can get the data off the local cache; it doesn't have to get it off the network. As will be described, during read/write operations, a block table access is made and flags set at the address locations where data is already stored or, is to be physical cached.

Thus, it is understood that, for the same reason that a page table and virtual memory manager are useful in conventional data storage systems, the invention allows a computer to access a large virtual map of storage while having a much smaller amount physically available in fast, local memory. The rest of the virtual data space is contained in a slower, remote data storage device or memory. User-level software at the workstation 50 neither knows nor cares which blocks currently reside in the local cache 60; accesses to un-cached blocks automatically cause loads of the needed data into local cache.

In accordance with the invention, devices may be programmed to, at a block level, automatically move parts of their data to other storage media, such as tape. A large server could use this to automatically and invisibly move data between a disk and tape. Since it works at a block level, parts of files could be moved without having to move the entire file, which reduces latency, e.g., when part(s) of a large (multi-gigabyte or multi-terabyte) file needs to be restored from tape.

This system is superior over an uncached file or block protocol accessing a remote disk because the vast majority of accesses will be to cached data and will thus not incur the latency of going through the network.

The system is superior over file-level caching because it allows individual blocks, not whole files, to be cached. Also, it would be possible to implement the virtual storage manager entirely in hardware. Implementing a file-level caching system in hardware would be much more difficult because the hardware would have to account for file permissions, file locking, and other operating system complexities.

The system is additionally superior over RAM-only caching because disk is substantially cheaper per megabyte than RAM. Thus, while larger (multi-gigabyte) RAM caches are only practical in the largest of systems, a multi-gigabyte local cache drive would be quire inexpensive, even for workstations.

The system is additionally superior over having a large local disk because it allows all of the data from a large group of users to be stored on a shared, centrally administered, high-availability system. This allows better utilization of resources (users with local disks usually either have too much or too little storage), less risk of data loss, centralized backup and restoration of data, better data security through central management, and the ability for a user to access his data from multiple client machines.

The system is additionally superior over a single, unified storage medium because the remote storage medium/media could be disk, tape, or some other medium. Old data is automatically moved from the fast medium (presumably a disk) to a slower medium (such as a tape) with a minimum of software interference. Later, when this data is accessed, it may be reloaded from tape automatically when a "block fault" is detected.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for caching data received over a network connection comprising:
   a target device linked to a computing network and capable of receiving requests for routing data packetized for transport according to an Internet SCSI (iSCSI) transport protocol, said target device including an iSCSI drive for processing received SCSI commands;
   an initiator device linked to said computing network for generating said SCSI commands for transport according to said iSCSI protocol, said commands including a command to read data from or write data to storage devices associated with said iSCSI drive; and,
   a local disk at said initiator device for storing a copy of data read from or written to the storage devices associated with said iSCSI drive; and,
   mapping means for mapping addresses associated with data stored at storage devices associated with said iSCSI drive with local data storage units in said local disk,
   wherein said local disk provides seamless local caching of data at said initiator device corresponding to data at remote data storage devices associated with said iSCSI drive.

2. The system for caching data as claimed in claim 1, wherein said local data storage units in said local disk comprise blocks.

3. The system for caching data as claimed in claim 2, wherein said local data storage mapping means for mapping addresses associated with data stored at storage devices includes a block table structure comprising a mapping of virtual block addresses to physical blocks on said local disk.

4. The system for caching data as claimed in claim 3, wherein said block table structure further comprises status information about what data is being cached at said physical block locations in the local disk.

5. The system for caching data as claimed in claim 3, further comprising a control means for managing access to and updating of the block table structure as data is being read from or written to said iSCSI drive over said network.

6. The system for caching data as claimed in claim 5, wherein said control means further initiates block swapping where one or more blocks from the cache are swapped out and blocks from the remote device attached through iSCSI protocol are swapped in when accesses to currently uncached blocks raise a block fault exception.

7. The system for caching data as claimed in claim 1, wherein the local disk at said initiator device comprises a hard disk drive associated therewith.

8. A method for caching data received over a network connection comprising the steps of:
   a) linking a target device to a computing network, said target device capable of receiving requests for routing data packetized for transport according to an Internet SCSI (iSCSI) transport protocol, said target device including an iSCSI drive for processing received SCSI commands;
   b) linking an initiator device to said computing network for generating said SCSI commands for transport according to said iSCSI protocol, said commands including a command to read data from or write data to storage devices associated with said iSCSI drive; and,
   c) providing a local disk at said initiator device for storing a copy of data read from or written to the storage devices associated with said iSCSI drive; and,
   d) mapping addresses associated with data stored at storage devices associated with said iSCSI drive with local data storage units in said local disk,
   wherein said local disk provides seamless local caching of data at said initiator device corresponding to data at remote data storage devices associated with said iSCSI drive.

9. The method for caching data as claimed in claim 8, wherein said local data storage units in said local disk comprise blocks.

10. The method for caching data as claimed in claim 9, wherein said mapping step d) includes implementing local data storage mapping means for mapping addresses associated with data stored at storage devices, said local data storage mapping means including a block table structure comprising a mapping of virtual block addresses to physical blocks on said local disk.

11. The method for caching data as claimed in claim 10, wherein said block table structure further comprises status information about what data is being cached at said physical block locations in the local disk, said mapping step d) including accessing said status information.

12. The method for caching data as claimed in claim 10, further comprising the steps of: managing access to and updating of the block table structure as data is being read from or written to said iSCSI drive over said network.

13. The method for caching data as claimed in claim 12, further comprising the steps of: swapping out one or more blocks from the cache and swapping in blocks from the remote device attached through iSCSI protocol when accesses to currently uncached blocks raise a block fault exception.

14. A program storage device readable by a machine, tangibly embodying a program of instructions executable by the machine to perform method steps for caching data received over a network connection, said method steps comprising:
   a) linking a target device to a computing network, said target device capable of receiving requests for routing data packetized for transport according to an Internet SCSI (iSCSI) transport protocol, said target device including an iSCSI drive for processing received SCSI commands;
   b) linking an initiator device to said computing network for generating said SCSI commands for transport according to said iSCSI protocol, said commands including a command to read data from or write data to storage devices associated with said iSCSI drive; and, c) providing a local disk at said initiator device for storing a copy of data read from or written to the storage devices associated with said iSCSI drive; and, d) mapping addresses associated with data stored at storage devices associated with said iSCSI drive with local data storage units in said local disk, wherein said local media storage means provides seamless local caching of data at said initiator device corresponding to data at remote data storage devices associated with said iSCSI drive.

15. The program storage device readable by a machine as claimed in claim 14, wherein said local data storage units in said local disk comprise blocks.

16. The program storage device readable by a machine as claimed in claim 15, wherein said mapping step d) includes implementing local data storage mapping means for mapping addresses associated with data stored at storage devices, said local data storage mapping means including a block table structure comprising a mapping of virtual block addresses to physical blocks on said local disk.

17. The program storage device readable by a machine as claimed in claim 16, wherein said block table structure further comprises status information about what data is being cached at said physical block locations in the local disk, said mapping step d) including accessing said status information.

18. The program storage device readable by a machine as claimed in claim 16, further comprising the step of: managing access to and updating of the block table structure as data is being read from or written to said iSCSI drive over said network.

19. The program storage device readable by a machine as claimed in claim 18, further comprising the steps of: swapping out one or more blocks from the cache and swapping in blocks from the remote device attached through iSCSI protocol when accesses to currently uncached blocks raise a block fault exception.

* * * * *